(12) United States Patent
Epenetos et al.

(10) Patent No.: US 10,625,922 B2
(45) Date of Patent: Apr. 21, 2020

(54) DEVICE AND METHODS FOR TRANSPORTING TEMPERATURE-SENSITIVE MATERIAL

(71) Applicant: C.B.B. Lifeline Biotech Limited, Nicosia (CY)

(72) Inventors: Agamemnon A. Epenetos, London (GB); Zacharias G. Kallis, Nicosia (CY); Kyriacos Matsis, Nicosia (CY)

(73) Assignee: C.B.B. Lifeline Biotech Limited, Nicosia (CY)

( * ) Notice: Subject to any disclaimer, the term of this patent is extended or adjusted under 35 U.S.C. 154(b) by 0 days.

(21) Appl. No.: 15/172,850

(22) Filed: Jun. 3, 2016

(65) Prior Publication Data

US 2016/0355318 A1 Dec. 8, 2016

Related U.S. Application Data

(60) Provisional application No. 62/171,805, filed on Jun. 5, 2015.

(51) Int. Cl.
| | |
|---|---|
| *B65D 81/38* | (2006.01) |
| *B65D 51/28* | (2006.01) |
| *F25D 3/08* | (2006.01) |
| *A47J 41/00* | (2006.01) |
| *B65D 81/24* | (2006.01) |
| *B65D 41/04* | (2006.01) |

(52) U.S. Cl.
CPC ...... *B65D 81/3806* (2013.01); *A47J 41/0072* (2013.01); *A47J 41/0088* (2013.01); *B65D 51/28* (2013.01); *B65D 81/24* (2013.01); *B65D 81/3841* (2013.01); *F25D 3/08* (2013.01); *B65D 41/0442* (2013.01); *F25D 2303/0844* (2013.01)

(58) Field of Classification Search
CPC ............................ B65D 81/3841; A61J 1/165
See application file for complete search history.

(56) References Cited

U.S. PATENT DOCUMENTS

| | | | | |
|---|---|---|---|---|
| 5,934,099 | A * | 8/1999 | Cook | A61J 1/165 206/570 |
| 6,381,981 | B1 * | 5/2002 | Yaddgo | F25D 3/125 62/372 |
| 6,467,299 | B1 * | 10/2002 | Coetzee | A61J 1/165 62/371 |
| 2005/0016895 | A1 * | 1/2005 | Glenn | A61J 1/165 206/570 |
| 2010/0282762 | A1 * | 11/2010 | Leonard | B65D 81/3841 220/592.01 |
| 2015/0136797 | A1 * | 5/2015 | Li | A47J 41/0077 220/592.26 |
| 2015/0197390 | A1 * | 7/2015 | Kurabe | B65D 81/3841 220/592.27 |

* cited by examiner

*Primary Examiner* — Shawn M Braden
(74) *Attorney, Agent, or Firm* — Richards Patent Law P.C.

(57) ABSTRACT

A container includes a container body including an inner wall and an outer wall, wherein the inner and outer walls are spaced apart and vacuum sealed, and wherein the container body includes an open end. A lid includes an upper portion with a threaded surface.

9 Claims, 8 Drawing Sheets

DEVICE AND METHODS FOR TRANSPORTING TEMPERATURE-SENSITIVE MATERIAL

CROSS-REFERENCE TO RELATED APPLICATIONS

This application incorporates by reference and claims the benefit of priority to U.S. Provisional Application Patent No. 62/171,805 filed Jun. 5, 2015.

BACKGROUND OF THE INVENTION

The present subject matter relates generally to containers used for transporting temperature sensitive materials.

Human organs and tissues, biological samples, pharmaceuticals, proteins, blood, blood products for transfusion, vaccines, food items and other temperature sensitive products are typically shipped in thermally insulated shipping containers regardless of external temperatures. Containers often include coolant packages to maintain a specific temperature within the container, but the coolant packages may shift during shipment, leading to unintended damage of the contents within the container. Additionally, shipping costs are calculated based on the actual weight or volumetric weight of the shipment, including the packaging and/or container. Minimizing the weight of the packing reduces the overall costs.

There is a need for maintaining or shipping temperature sensitive materials in a controlled temperature environment at a predefined temperature range throughout a specified shipment's duration.

BRIEF SUMMARY OF THE INVENTION

The present disclosure provides a portable and reusable container that maintains and/or transports tissues, organs, biological materials, medicines, food or any other temperature sensitive material within a predefined temperature range, in an insulated environment for a prolonged period of time or course of shipment. The container protects the contents from external temperature variations during shipment. A lightweight and thermally insulated container is desirable that protects its contents from any environmental temperature variations. The container of the present disclosure may be constructed of variable thickness stainless steel or aluminum sheets pending on requirements.

In one embodiment, the container includes a double-walled, vacuum sealed body and a lid. The lid includes an upper portion and a shelf spaced from the upper portion. The upper portion includes a threaded surface. The shelf is positioned within the container when the lid is screwed onto the upper end of the container.

In some embodiments, the upper portion of the lid is filled with insulated material. One or more coolant packages may be positioned on the shelf of the lid.

In other embodiments, the container may be used to maintain a desired specific temperature range of the shipping material. The desired specific temperature range may fall within the wide range of −25 and +45 degrees Celsius. The type and volume of PMC material used in this device may be adjusted accordingly pending on (a) the desired specific temperature and (b) the desired duration/period of maintaining the shipping material and (c) the expected external temperature during shipment. In other embodiments, the lid may provide a space between the upper part and the lid extension for placing a GPS tracking and temperature recording and reporting device via cell phone networks for reporting geographic location and kept temperatures of the material in shipment. In other embodiments, the lid can be manufactured with the same material as the body of the container using the same concept of double walls vacuumed sealed for additional insulation and achieve an extended shipping time.

In another aspect of the invention, a method of shipping contents includes the steps of providing a container, the container comprising a container body and a lid. The container body includes an inner wall and an outer wall that are spaced apart and vacuum sealed, and a threaded surface at an upper end. The lid includes an upper portion and a shelf spaced from the upper portion, wherein the upper portion includes a threaded surface. The method further includes the steps of separating the lid from the container body, placing the contents into the container, and screwing the lid onto the upper end of the container so that the shelf is positioned within the container. In one embodiment, the method further includes the step of positioning a coolant package onto the shelf before the step of screwing the lid.

One objective of the present disclosure is to provide a portable device for use in the medical services, the pharmaceutical industry, or anyone required to carry and/or ship and/or deliver temperature sensitive materials.

Another objective of this invention is to provide safety and protection from accidental damage to the contents of the container during the course of shipment.

Additional objects, advantages and novel features of the examples will be set forth in part in the description which follows, and in part will become apparent to those skilled in the art upon examination of the following description and the accompanying drawings or may be learned by production or operation of the examples. The objects and advantages of the concepts may be realized and attained by means of the methodologies, instrumentalities and combinations particularly pointed out in the appended claims.

BRIEF DESCRIPTION OF THE DRAWINGS

The drawing figures depict one or more implementations in accord with the present concepts, by way of example only, not by way of limitations. In the figures, like reference numerals refer to the same or similar elements.

DETAILED DESCRIPTION OF THE INVENTION

The present disclosure provides a container and methods for maintaining and/or transporting temperature sensitive contents within a predefined temperature range for a period of time.

Figure 1:
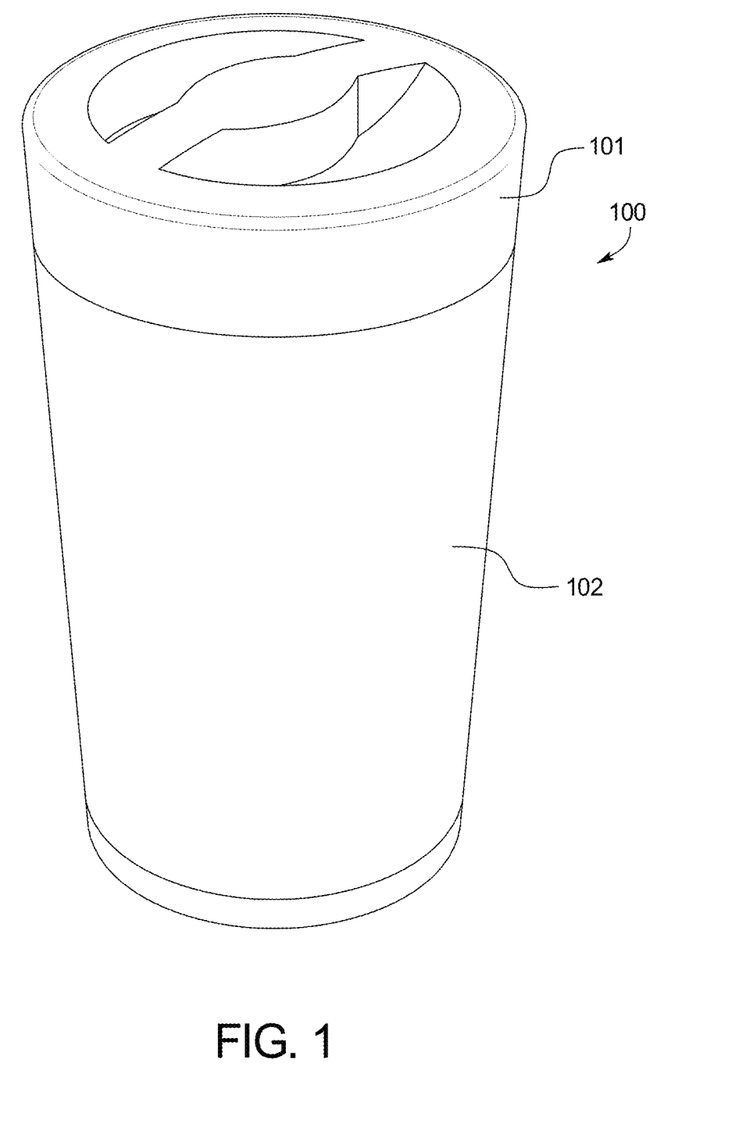
FIG. 1 is a perspective view of an embodiment of a container of the present application.
Figure 2:
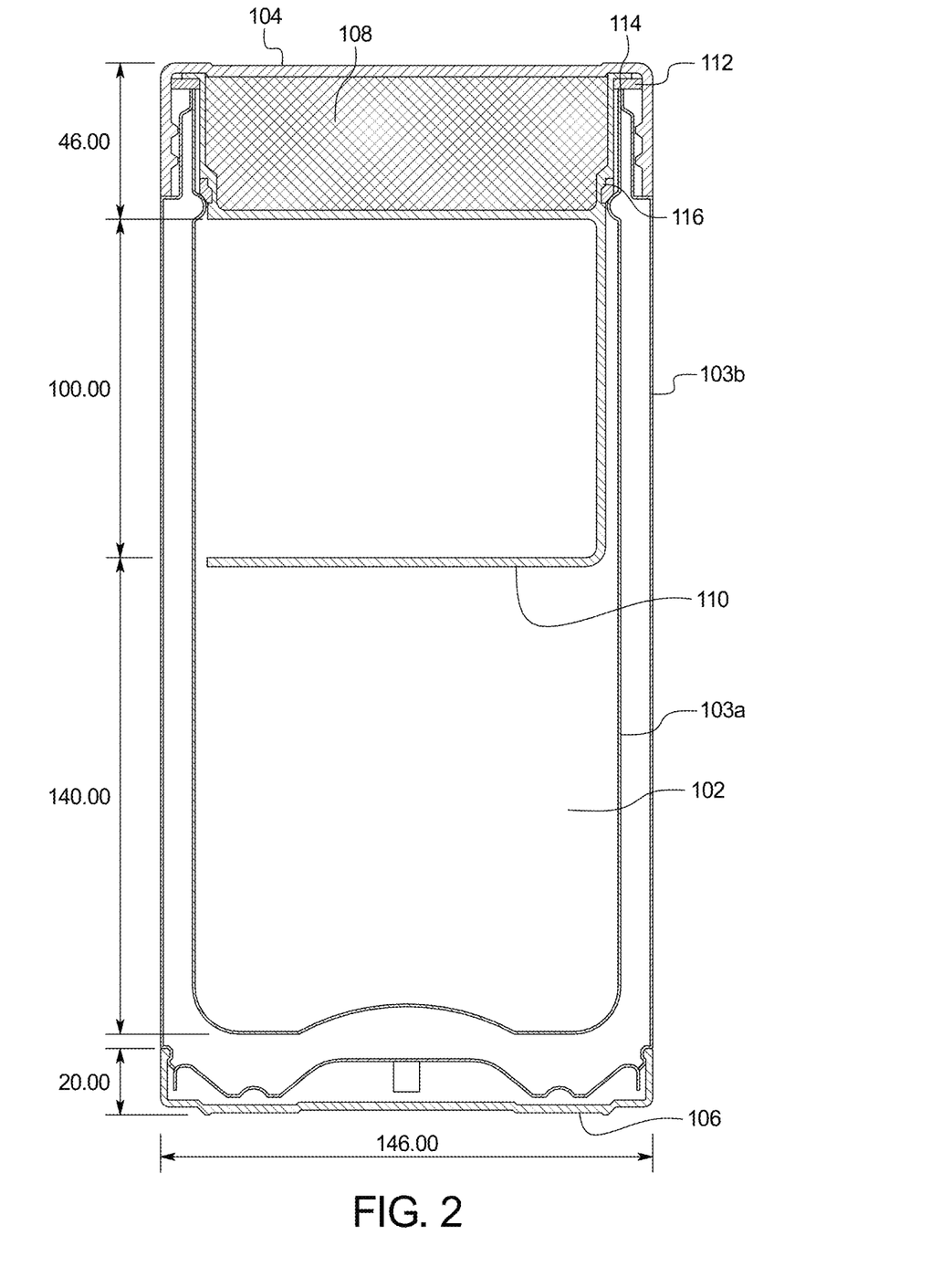
FIG. 2 is a cross-sectional side view of the container taken generally along lines 2-2 of FIG. 1.

FIG. 1 illustrates a container 100 including a container body 102 and a lid 104. As shown in FIG. 2, the container body 102 may be double walled, including first and second walls 103a, 103b spaced apart at approximately 10 mm and vacuum sealed for thermal insulation. In the illustrated embodiment, the container body 102 has a cylindrical shape with a capacity of 2.85 L, although other shapes and sizes may be used as desired or appropriate under the circumstances. The container body 102 may be made of stainless steel SUS304 or any similar material suitable for use in the medical and food industries, among others. The interior of the container body 102 near the closed, bottom end 106 provides space to accommodate the contents to be shipped and can be modified in volume as per requirements.

Figure 3:
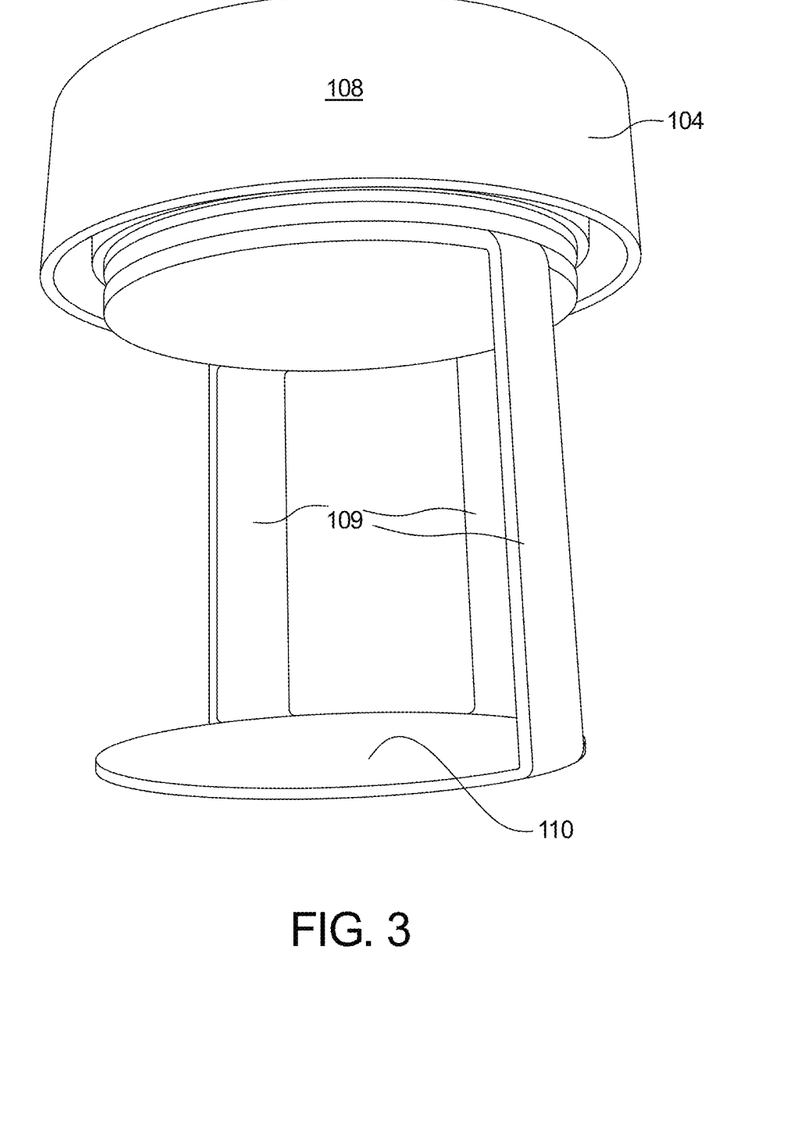
FIG. 3 is a perspective view of a lid of the container of FIG. 1.

Referring to FIGS. 2 and 3, the lid 104 includes an upper portion 108 and a shelf 110 spaced from the upper portion 108. The upper portion 108 may be filled with thermally insulated material. The lid 104 seals the container body 102 by screwing onto the open end 112 of the container 100. First and second silicon rings 114, 116 are fitted onto the lid 104 to enable a perfect fit on the open end 112 of the container 100, providing additional insulation and thus preventing heat exchange. The lid 104 may be made of high density polyethylene (HDPE) plastic. The shelf 110 may be connected to the upper portion 108 by one or more spacers 109. The one or more spacers 109 may be formed integrally with the upper portion 108 and the shelf 110, or each of the upper portion 108, the spacer(s) 109, and the shelf 110 may be separate components.

Figure 4:
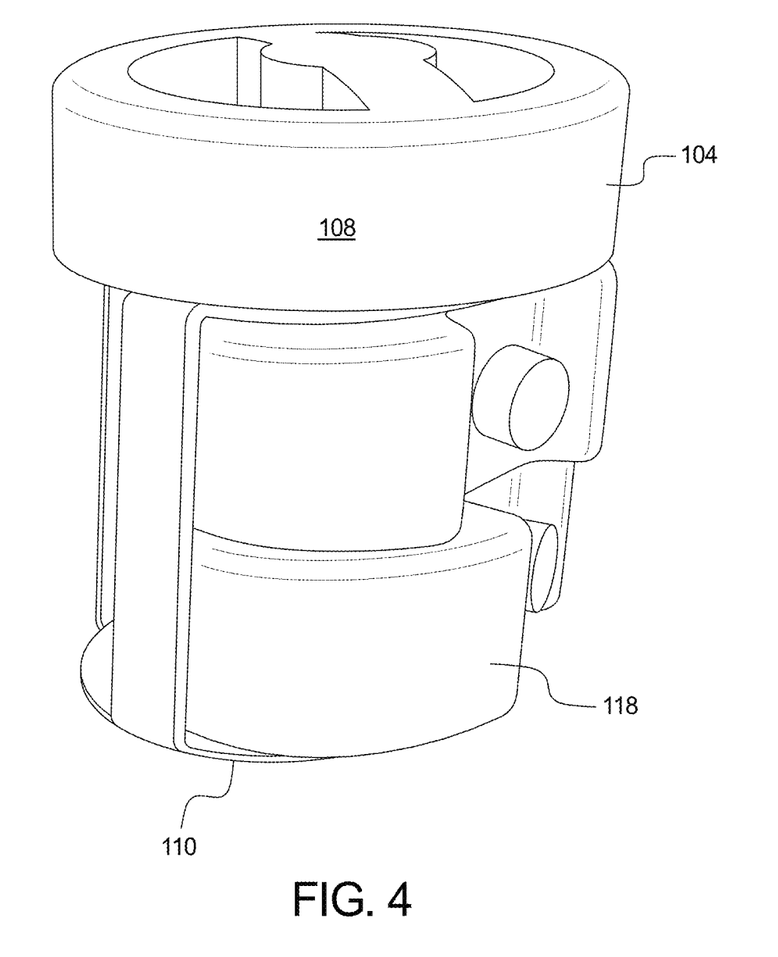
FIG. 4 is a perspective view of the lid of FIG. 3 including coolant packages.
Figure 5:
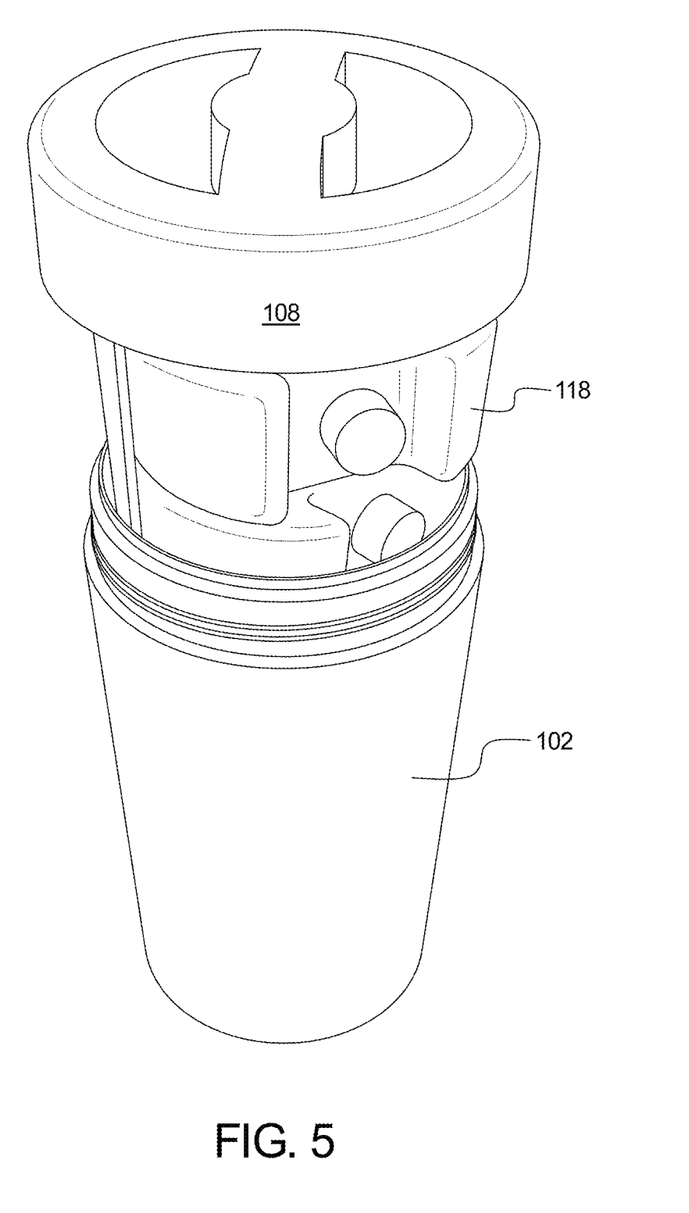
FIG. 5 is a perspective view of the lid of FIG. 4 as it is inserted into the container of FIG. 1.

During use, one or more coolant packages 118 are positioned on the shelf 110 of the lid 104 prior to closing the container 100 as shown in FIGS. 4 and 5. The shelf 110 extends into the interior of the container 100 body but prevents direct contact of the coolant packages 118 with the temperature sensitive contents.

Figure 6:
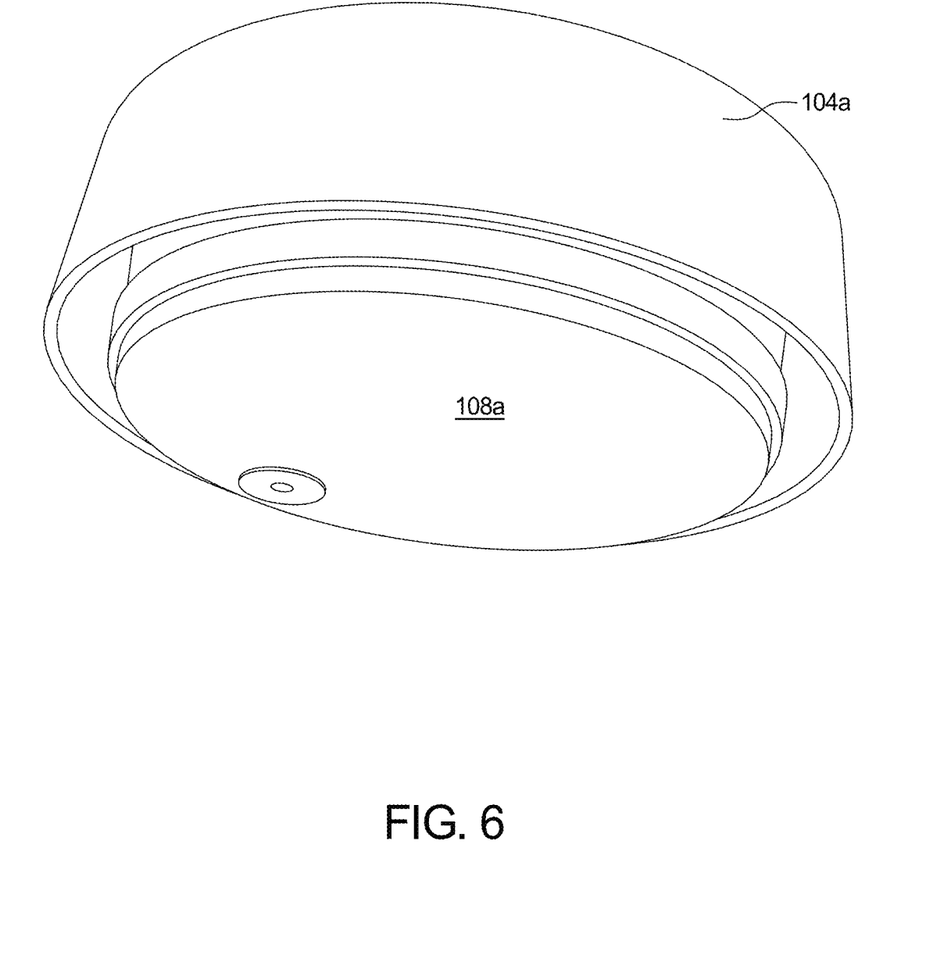
FIG. 6 is a perspective view of an alternative embodiment of a lid for the container of FIG. 1.

In an alternative embodiment of a lid 104a shown in FIG. 6, the lid 104a does not include the shelf 110. In this embodiment, the coolant packages 118 are placed into the interior of the container body 102 with the temperature-sensitive contents prior to closing the container 100 with the lid 104a. The lid 104a includes an upper portion 108a that may be filled with an insulated material.

The coolant packages may be Phase Changing Material (PMC) packs having HDPE plastic containers as illustrated in FIG. 4. The coolant package(s) may include other materials to maintain the desired temperature during shipment without the need for additional energy support. A PCM has a high heat of fusion which melts and solidifies at specific temperature. PCMs store and release thermal energy during the transition between phases, such as freezing and melting. When a PCM freezes, it releases large amounts of energy in the form of latent heat of fusion, or energy of crystallization. Conversely, when the material (PCM) is melted, changes from solid to liquid, an equal amount of energy is absorbed from the immediate environment, the internal compartment of the invention container where the shipped materials are located. This property of PCMs can be used in a number of ways, such as thermal energy storage whereby heat or coolness can be stored from one process or period in time, and used at a later date or different location. Different PCMs change phase at different temperature and this make them suitable for keeping various temperature ranges during shipment, thus serving various needs.

PCMs are also useful in providing thermal barriers or insulation, for example in temperature controlled transport. A non toxic PCM is used for the shipments of medical, biological or food products. The PCM plastic packs may be filled with variable grades of PCM according to the desired kept temperature, therefore serving various needs ranging from about −25° C. to about +45° C. or higher. As an example, for maintaining a desired temperatures range of a specified volume of shipment between about +8° C. to about +10° C., the PCM packs are filled in with a PCM that change phase at about 5° C. The PMC packs are maintained in deep freeze at about −18° C. to about −26° C. such as in a domestic freezer for at least about 6 hours prior to use as coolant in this device. However, should there be a requirement for a shorter freezing period, PMC packs of reduced volume and thickness may be used to achieve faster solidification or freezing of the PCM material and allow their use following a 2-hour exposure or less at a deep freezer temperature. As another example, if the shipment takes place in arctic or polar conditions, the PCM shall not be frozen prior to its use.

Other coolant material such as single use breakable icepacks or other common domestic icepacks (such as picnic ice packs) may also be employed with or without the lid's extension in order to achieve a different temperature range and for a different time period of shipment according to specific needs.

Prior to shipment, the coolant package(s) are placed on the shelf of the lid as shown in FIG. 4. The contents to be shipped are placed through the opening of the container into the interior thereof. Use of the container eliminates immediate temperature fluctuations within the interior of the container and of the contents when external temperature fluctuates, and when the shipment travels in a range of between about −26° C. to about 45° C., maintains a narrow internal (within the desired) temperature range throughout the journey.

All components of the container are suitable for multiple use and are thus environmental friendly. All components are also suitable for decontamination and/or sterilization. The internal compartment of the container consists of suitable materials for medical, pharmaceutical or the food industry.

Tests/Trials Performed

The device has been tested for various uses. As an example, the use for the transportation of sensitive biological material, such as umbilical cord blood and umbilical cord tissue units, is described below. Umbilical cord blood and umbilical cord tissue are temperature sensitive biological material transported extensively throughout the globe to be processed and cryopreserved as cellular therapy products at relevant facilities. Strong scientific evidence suggests that the temperature ranges of such biological material should be between about 4° C. and about 26° C., as exposure of the biological material at temperatures outside the specified range has a devastating effect on the viability of the cells and hence the quality of such biological material. Furthermore, there is scientific evidence suggesting that the quality of such units (in term of maintaining the unit viability) is enhanced when such units are maintained within the range of about 4° C. and as low as possible, preferably below about 20° C.

Example 1

Figure 7:
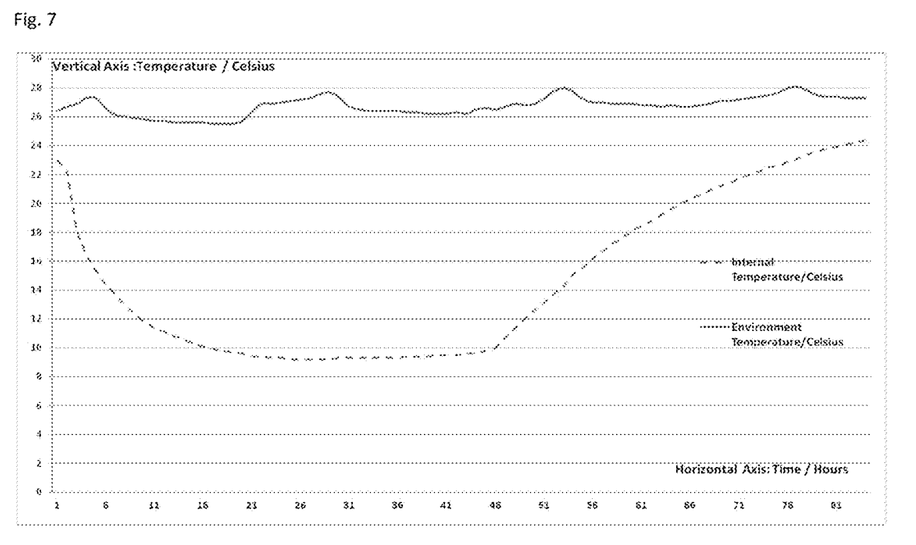
FIG. 7 is a graph illustrating the temperature within and outside of the container per Example 1.

A Unit (umbilical cord blood) at an initial temperature of 23° C. was sealed in a zip lock bag containing appropriate absorbent material as per IATA requirements and was placed in the lower part of the container. The lid included two 5° C. PCM packs previously kept for 24 hours in a domestic freezer, at approximately −22° C.+/−2° C. The container was maintained in an environment with temperatures ranging from 26° C. to 28° C. for a total period of 90 hours as seen in FIG. 7. The Unit's temperature remained below the threshold of 26° C., which is the maximum desired temperature for such biological units. The temperature of the unit had been gradually decreased to reach the final holding temperature of 9° C., over a period of 15 hours thus avoiding the effect of a "cold shock" that would otherwise damage the unit and affect the viability of cells. The temperature of the unit had been maintained at approximately 9° C. for a further 30 hours, providing ample shipping time at appropriate temperature conditions for the shipment of such units from the procurement sites to the processing and storage facility.

Example 2

Figure 8:
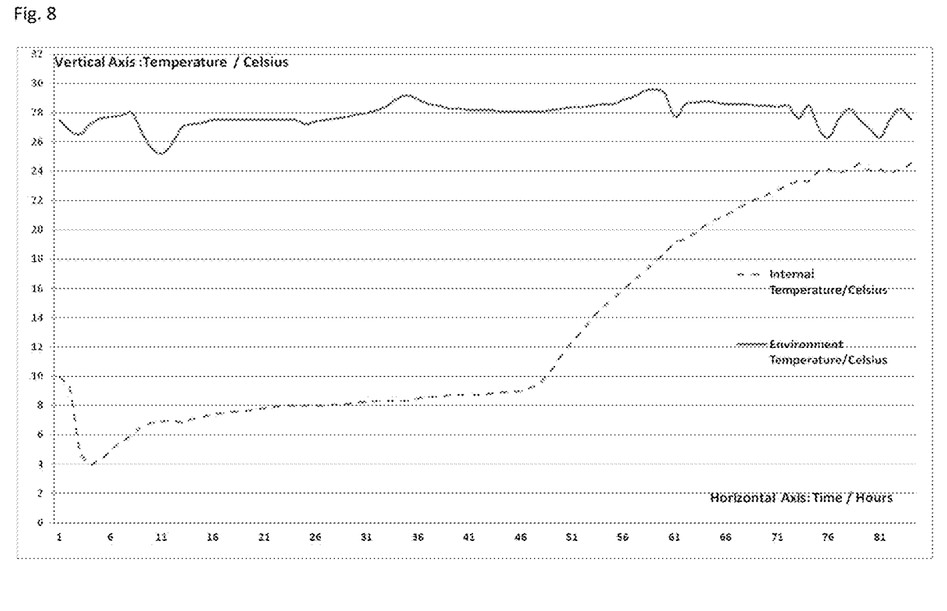
FIG. 8 is a graph illustrating the temperature within and outside of the container per Example 2.

A Unit at temperature of 10° C. was sealed in a zip lock bag containing appropriate absorbent material as per IATA requirements, placed in the lower part of the container and closed with the lid loaded with two 5° C. PCM packs previously kept for 24 hours in a domestic freezer, at approximately −20° C. The container was placed in external temperature, ranging from 25° C. up to 29° C. for 90 hours. The Unit's temperature was kept between 4° C. and 10° C. for the first 48 hours and between 10° C. and 24° C. for the remaining shipping time of 42 hours. Total 90 hours within a temperature range of 4° C. and 24° C., as seen in FIG. 8.

Example 3

Figure 9:
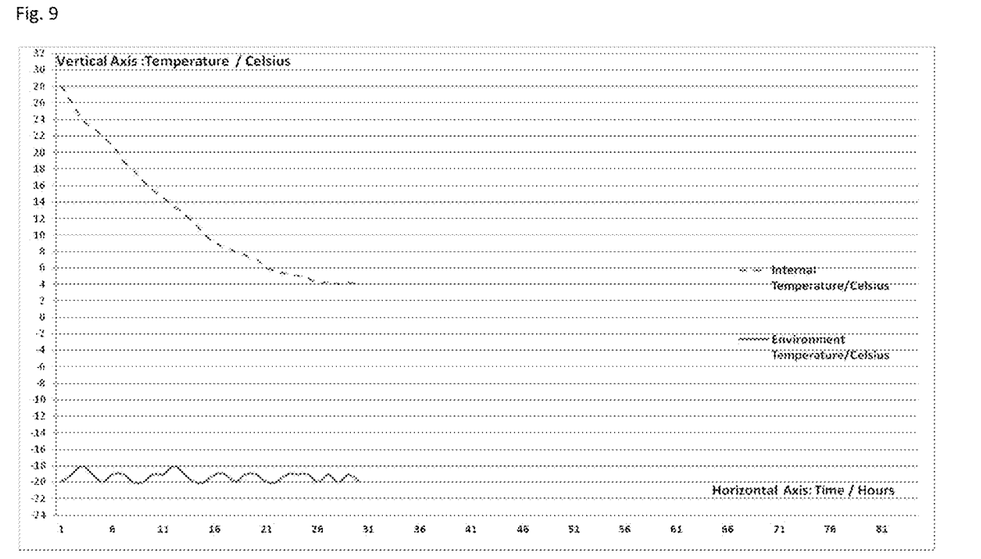
FIG. 9 is a graph illustrating the temperature within and outside of the container per Example 3.

A Unit at temperature of 28° C. sealed in a zip lock bag containing appropriate absorbent material as per IATA requirements, was, placed in the lower part of the container and closed with the lid loaded with two 5° C. PCM packs previously kept for 24 hours at normal room temperature approximately 28° C. The container was placed in an environment with external temperature of between about −20° C. and about −18° C. for a period of 30 hours. The Unit's temperature remained above the threshold of 4° C. as provided in FIG. 9.

Example 4

Figure 10:
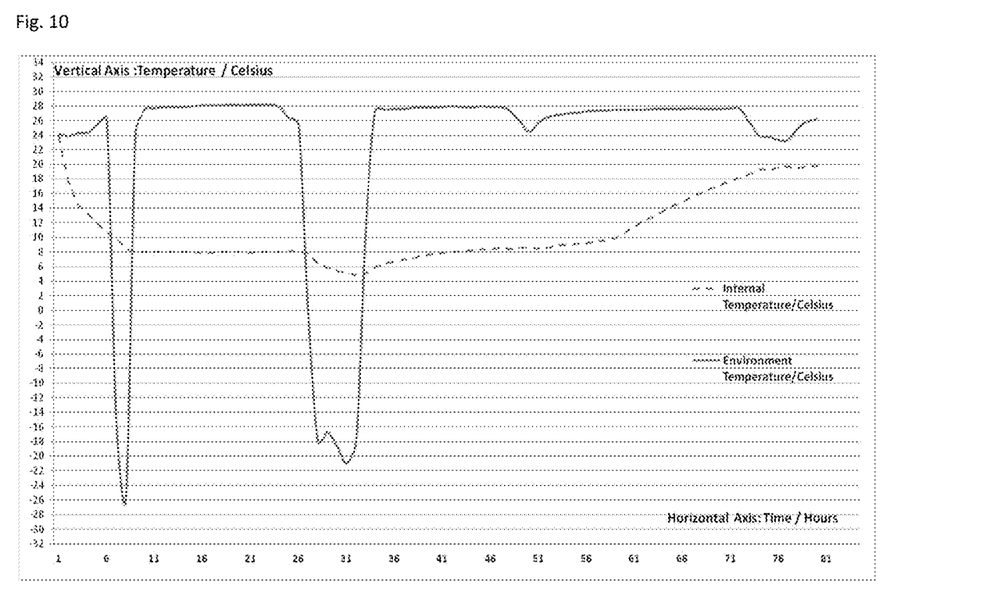
FIG. 10 is a graph illustrating the temperature within and outside of the container per Example 4.

A Unit at temperature of 24° C. was sealed in a zip lock bag containing appropriate absorbent material as per IATA requirements, placed in the lower part of the container and closed with the lid loaded with two 5° C. PCM packs previously kept for 24 hours in a domestic freezer, at approximately −20° C. The container was placed in an environment with temperature ranging from −26° C. (below zero) up to +28° C. (above zero). The container was transferred for certain time intervals at different external/environment temperatures as shown in Table 1. The total holding or shipping duration lasted 80 hours. As seen in FIG. 10, the Unit's temperature had been maintained between 5° C. and 20° C. for the entire duration of the trial. Extreme ambient temperature variations of −26° C. up to +26° C. have minimally influenced the Unit's temperature which was maintained within a range of 5° C. and 10° C. during the first 60 hours and between +10° C. to +20° C. during the last 20 hours of the shipping time.

TABLE 1

| Number of external temperature fluctuations during shipment | Shipment's external temperature (° C.) | Number of Hours the shipment remained in certain external temperature | Unit's temperature inside the container (° C.) |
| --- | --- | --- | --- |
| 1 | 25° C. | 6 hrs | 23° C. to 10° C. |
| 2 | −26° C. | 2 hrs | 10° C. to 8° C. |
| 3 | 28° C. | 18 hrs | constant at 8° C. |
| 4 | −26° C. | 6 hrs | 8° C. to 5° C. |
| 5 | 27° C. | 28 hrs | 5° C. to 10° C. |
| 6 | 27° C. | 20 hrs | 10° C. to 20° C. |
| Entire shipment | −26° C. (below zero) to +28° C. (above zero) | 80 hrs | 5° C. to 20° C. |

Moreover, by using different PCM (that changes phase at a different degree) and in combination with various PCM volumes, a wide range of shipment requirement can be satisfied.

It should be noted that various changes and modifications to the embodiments described herein will be apparent to those skilled in the art. Such changes and modifications may be made without departing from the spirit and scope of the present invention and without diminishing its attendant advantages. For example, various embodiments of the method and container may be provided based on various combinations of the features and functions from the subject matter provided herein.

We claim:

1. A container comprising:
    a container body including an inner wall and an outer wall, wherein the inner and outer walls are spaced apart and vacuum sealed, and wherein the container body includes an open end;
    a lid including an upper portion having a threaded surface that engages with the open end of the container body and a horizontal support connected to the upper portion through a vertical support that forms a right angle with the horizontal support; and
    one or more coolant packages positioned on the horizontal support and spaced from a bottom end of the container body;
    wherein the horizontal support is positioned within an interior of the container body when the lid is secured to the open end of the container body.

2. The container of claim 1, wherein the vertical support comprises one or more spacers.

3. The container of claim 1, wherein the upper portion of the lid is filled with insulated material.

4. The container of claim 1, wherein the one or more coolant packages comprise a phase change material.

5. The container of claim 1, wherein the container maintains a temperature of between about −25° C. to about +45° C.

6. The container of claim 5, wherein the container maintains a temperature of between about 4° C. to about 24° C. for at least 90 hours.

7. The container of claim 6, wherein the container maintains a temperature of between about 5° C. to about 20° C. for at least 80 hours.

8. A container comprising:
    a container body including an inner wall and an outer wall, wherein the inner and outer walls are spaced apart and vacuum sealed, and wherein the container body includes an open end;

a lid including an upper portion and a horizontal support connected to the upper portion, wherein the horizontal support is integral with the upper portion of the lid through a vertical support that forms a right angle with the horizontal support, wherein the upper portion is filled with an insulated material and includes a threaded surface; and one or more coolant packages positioned on the horizontal support and spaced from a bottom end of the container body;

wherein the horizontal support is positioned within the container when the lid is screwed onto the open end of the container body.

9. A method of shipping contents, comprising the steps of:

providing a container, the container comprising:

a container body including an inner wall and an outer wall, wherein the inner and outer walls are spaced apart and vacuum sealed, and wherein the container body includes a threaded surface at an upper end; and    a lid including an upper portion and a horizontal support connected to the upper portion through a vertical support that forms a right angle with the horizontal support, wherein the upper portion includes a threaded surface, wherein the horizontal support is integral with the upper portion of the lid and is spaced from a bottom end of the container body;

separating the lid from the container body;

placing the contents into the container;

positioning one or more coolant packages on the horizontal support of the lid; and screwing the lid onto the upper end of the container so that the horizontal support is positioned within the container.

* * * * *